(12) United States Patent
Zhang et al.

(10) Patent No.: US 12,391,184 B2
(45) Date of Patent: Aug. 19, 2025

(54) DISPLAY CONTROL DEVICE, DISPLAY METHOD, AND STORAGE MEDIUM (71) Applicant: TOYOTA JIDOSHA KABUSHIKI KAISHA, Toyota (JP)

(72) Inventors: Yuting Zhang, Toyota (JP); Takahiro Hirota, Nukata-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 302 days.

(21) Appl. No.: 17/836,472

(22) Filed: Jun. 9, 2022

(65) Prior Publication Data
US 2023/0009636 A1 Jan. 12, 2023

(30) Foreign Application Priority Data

Jul. 7, 2021 (JP) ................. 2021-113106

(51) Int. Cl.
B60R 1/24 (2022.01)
B60K 35/00 (2024.01)
(Continued)

(52) U.S. Cl.
CPC ................ *B60R 1/24* (2022.01); *B60K 35/00* (2013.01); *B60K 35/22* (2024.01); *B60K 35/28* (2024.01);
(Continued)

(58) Field of Classification Search
CPC . B60R 1/24; B60R 2300/205; B60R 2300/70; B60K 35/00; B60K 35/81;
(Continued)

(56) References Cited

U.S. PATENT DOCUMENTS 11,982,539 B2 * 5/2024 Horihata ............... G01C 21/365
2005/0187710 A1 * 8/2005 Walker ..................... B60Q 1/34
701/431
(Continued)

FOREIGN PATENT DOCUMENTS

DE 102013224307 A1 5/2015
JP 2006-242905 A 9/2006
(Continued)

OTHER PUBLICATIONS

"New Mercedes S class 2021—Crazy heads-up display with augmented reality (77 inches diagonal)" (URL: https://www.youtube.com/watch?v=DCgy3askMcM) (Year: 2021).*
"New Mercedes S class 2021—Crazy heads-up display with augmented reality (77 inches diagonal)", URL: https://www.youtube.com/watch?v=DCgy3askMcM, Feb. 14, 2021, 1 page.

*Primary Examiner* — Naeem Taslim Alam
(74) *Attorney, Agent, or Firm* — Oblon, McClelland, Maier & Neustadt, L.L.P.

(57) ABSTRACT

A vehicle display control device, which displays a predetermined image at a display region showing a foreground of a vehicle, includes a memory, and a processor connected to the memory. In a case in which a change operation that changes an advancing direction of the vehicle is planned, the processor displays at least one directional image, which indicates an advancing direction after the change, in the display region, and changes a number of the directional images during a time period until the vehicle reaches a change operation point at which the change operation is to be carried out.

8 Claims, 7 Drawing Sheets (51) Int. Cl.
*B60K 35/22* (2024.01)
*B60K 35/28* (2024.01)
*B60K 35/29* (2024.01)
*B60K 35/81* (2024.01)

(52) U.S. Cl.
CPC .............. *B60K 35/29* (2024.01); *B60K 35/81* (2024.01); *B60K 2360/1526* (2024.01); *B60K 2360/176* (2024.01); *B60K 2360/184* (2024.01); *B60R 2300/205* (2013.01); *B60R 2300/70* (2013.01)

(58) Field of Classification Search
CPC .. B60K 35/28; B60K 2360/176; B60K 35/29; B60K 2360/1526; B60K 35/22; B60K 2360/184
See application file for complete search history.

(56) References Cited

U.S. PATENT DOCUMENTS

| | | | | |
|---|---|---|---|---|
| 2016/0052394 A1* | 2/2016 | Yamada | ................. | B60K 35/50 701/93 |
| 2019/0025580 A1* | 1/2019 | Nagano | ................. | B60K 35/00 |
| 2019/0182435 A1 | 6/2019 | Nakayama et al. | | |
| 2021/0016793 A1* | 1/2021 | Yamaguchi | ............ | B60K 35/81 |
| 2024/0053163 A1* | 2/2024 | Shtok | ................... | G01C 21/365 |

FOREIGN PATENT DOCUMENTS

| | | |
|---|---|---|
| JP | 2006-284458 A | 10/2006 |
| JP | 2015-141155 A | 8/2015 |
| JP | 2019-10965 A | 1/2019 |
| JP | 2019-104275 A | 6/2019 |
| WO | 2021/064938 A1 | 4/2021 |

\* cited by examiner

DISPLAY CONTROL DEVICE, DISPLAY METHOD, AND STORAGE MEDIUM

CROSS-REFERENCE TO RELATED APPLICATION

This application is on the basis of and claims priority under 35 USC 119 from Japanese Patent Application No. 2021-113106 filed on Jul. 7, 2021, the disclosure of which is incorporated by reference herein.

BACKGROUND

Technical Field

The present disclosure relates to a vehicle display control device, a display method, and a storage medium.

Related Art

Japanese Patent Application Laid-Open (JP-A) No. 2019-104275 discloses an onboard system in which a guidance route to the destination of a vehicle is set, and information relating to a path change, such as a right or left turn or the like, is displayed on a front window in accordance with the set guidance route.

In this onboard system, the distance to an intersection at which a path change such as a right or left turn or the like will be carried out is displayed by character information, and the direction of the change in the path at the intersection is displayed by an image of an arrow.

However, the timing at which the advancing direction of the vehicle is to be changed cannot be intuitively grasped by merely displaying, by using character information, the distance to the point where the path change, such as a right or left turn or the like, will be carried out.

SUMMARY

The present disclosure has been made in consideration of the above-described point, and an object thereof is to provide a vehicle display control device, a display method, and a storage medium by which the timing at which the advancing direction of a vehicle is to be changed can be grasped intuitively.

A vehicle display control device relating to a first aspect of the present disclosure is a vehicle display control device that displays a predetermined image at a display region showing a foreground of a vehicle, and includes a display control section that, in a case in which a change operation that changes an advancing direction of the vehicle is planned, displays at least one directional image, which indicates an advancing direction after the change operation, at the display region, and changes a number of the directional images during a time period until the vehicle reaches a change operation point at which the change operation is to be carried out.

In accordance with the first aspect, the vehicle display control device displays a predetermined image at the display region that shows the foreground of the vehicle. The vehicle display control device has the display control section. In case in which a change operation that changes the advancing direction of the vehicle is planned, the display control section causes at least one directional image, which indicates the advancing direction after the change operation, to be displayed at the display region. Due thereto, by looking at the display region, a vehicle occupant can understand that there is a plan to change the advancing direction of the vehicle to the direction indicated by the directional image.

Here, the display control section displays the directional images while changing the number thereof during the time period until the vehicle reaches the change operation point at which the change operation is to be carried out. Due thereto, by changing the number of directional images, the extent of reaching the change operation point can be expressed, and therefore, the vehicle occupant can intuitively understand the timing at which the advancing direction of the vehicle is to be changed.

In a vehicle display control device relating to a second aspect of the present disclosure, in the configuration of the first aspect, the display control section changes the number of directional images in a case in which at least one of a distance or a time from the vehicle to the change operation point is less than or equal to a predetermined threshold value.

In accordance with the second aspect, in a case in which at least one of the distance and the time from the vehicle to the change operation point is less than or equal to a predetermined threshold value, the directional images are displayed while changing the number thereof. Due thereto, the number of directional images can be changed in accordance with the actual extent to which the vehicle has reached the change operation point. Therefore, the vehicle occupant can intuitively and accurately grasp the timing at which the advancing direction of the vehicle is to be changed.

In a vehicle display control device relating to a third aspect of the present disclosure, in the configuration of the first aspect or the second aspect, the display control section increases the number of directional images during the time period until the vehicle reaches the change operation point.

In accordance with the third aspect, the directional images are displayed with the number thereof being increased during the time period until the vehicle reaches the change operation point. The directional images are thereby displayed while being emphasized gradually. Due thereto, the extent of reaching the change operation point can be expressed, and the vehicle occupant can intuitively grasp the timing at which the advancing direction of the vehicle is to be changed.

In a vehicle display control device relating to a fourth aspect of the present disclosure, in the configuration of any one of the first aspect through the third aspect, the display control section displays the directional image such that the directional image moves from a near side toward a far side of the display region, along a path from the vehicle to the change operation point.

In accordance with the fourth aspect, the directional image is displayed so as to move from the near side toward the far side of the display region along the path from the vehicle to the change operation point. Due thereto, the vehicle occupant can intuitively grasp that the change operation point exists ahead of the current travelling point of the vehicle, and can feel secure that he/she has not missed the change operation point.

In a vehicle display control device relating to a fifth aspect of the present disclosure, in the configuration of any one of the first aspect through the fourth aspect, after the vehicle has passed the change operation point, the display control section displays the directional image such that the directional image moves in the advancing direction after the change.

In accordance with the fifth aspect, after the vehicle has passed through the change operation point, the directional image is displayed so as to move in the advancing direction after the change. Due thereto, at the time when the advancing direction of the vehicle is to be changed, it is easy for the vehicle occupant to visually comprehend the post-change advancing direction.

In a vehicle display control device relating to a sixth aspect of the present disclosure, in the configuration of any one of the first aspect through the fifth aspect, the change operation point is an operation point at which a turn signal is to be turned on in order to change the advancing direction of the vehicle.

In accordance with the sixth aspect, by looking at the display region, the vehicle occupant can intuitively grasp the timing at which to turn the turn signal on in order to change the advancing direction of the vehicle.

In a vehicle display control device relating to a seventh aspect of the present disclosure, in the configuration of any one of the first aspect through the fifth aspect, the change operation point is an operation point at which a steering operation is to be carried out in order to change the advancing direction of the vehicle.

In accordance with the seventh aspect, by looking at the display region, the vehicle occupant can intuitively grasp the timing at which to operate the steering in order to change the advancing direction of the vehicle.

In a vehicle display control device relating to an eighth aspect of the present disclosure, in the configuration of any one of the first aspect through the seventh aspect, the display region is a projected plane that is projected at a vehicle front side of a driver's seat by a head-up display device, and the display control section specifies the change operation point from the foreground of the vehicle viewed through the display region, and displays the directional image at a position corresponding to the change operation point in the display region.

In accordance with the eighth aspect, the display region that shows the foreground of the vehicle is a projected plane that is projected at the vehicle front side of the driver's seat by a head-up display device. The display control section specifies the change operation point from the foreground of the vehicle that is viewed through the display region, and causes the directional image to be displayed at a position corresponding to the change operation point in the display region. In this way, the vehicle display control device displays the directional image so as to be superimposed on the foreground that can be seen from the driver's seat. Therefore, the vehicle occupant in the driver's seat can intuitively recognize the timing at which the advancing direction is to be changed, without significantly moving his/her sightline.

A display method relating to a ninth aspect of the present disclosure is a display method that displays a predetermined image at a display region showing a foreground of a vehicle, including: in a case in which a change operation that changes an advancing direction of the vehicle is planned, displaying at least one directional image, which indicates an advancing direction after the change operation, at the display region, and changing a number of the directional images during a time period until the vehicle reaches a change operation point at which the change operation is to be carried out.

In accordance with the display method relating to the ninth aspect, as described above, by looking at the display region, the vehicle occupant can intuitively grasp the timing at which the advancing direction of the vehicle is to be changed.

A program relating to a tenth aspect of the present disclosure is a program that causes a predetermined image to be displayed at a display region showing a foreground of a vehicle, and causes a computer to execute, in a case in which a change operation that changes an advancing direction of the vehicle is planned, displaying of at least one directional image, which indicates an advancing direction after the change operation, at the display region, and changing of a number of the directional images during a time period until the vehicle reaches a change operation point at which the change operation is to be carried out.

In accordance with the program relating to the tenth aspect, as described above, by looking at the display region, the vehicle occupant can intuitively grasp the timing at which the advancing direction of the vehicle is to be changed.

In accordance with the present disclosure, the timing at which the advancing direction of a vehicle is to be changed can be grasped intuitively.

BRIEF DESCRIPTION OF THE DRAWINGS

Exemplary embodiments of the present invention will be described in detail on the basis of the following figures, wherein.

DETAILED DESCRIPTION

Figure 1:
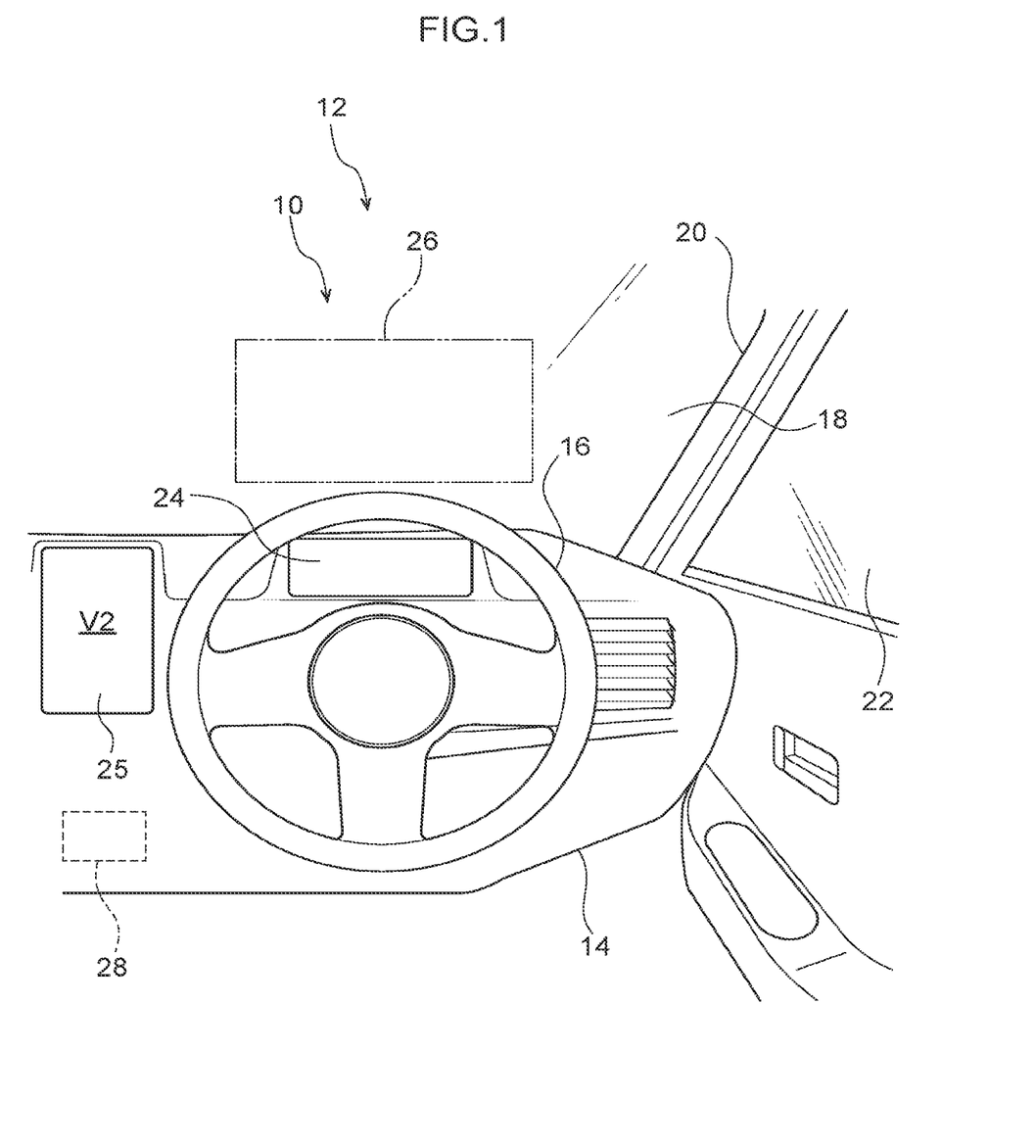
FIG. 1 is a schematic drawing in which the front portion of a vehicle cabin interior of a vehicle, to which a vehicle display control device relating to a present exemplary embodiment is applied, is viewed from a vehicle rear side.

A vehicle 12, to which a vehicle display control device 10 relating to an exemplary embodiment is applied, is described with reference to the drawings. Note that, as an example, the vehicle 12 of the present exemplary embodiment is configured so as to be able to switch between autonomous driving and manual driving. Note that autonomous driving is a traveling mode of the vehicle in which some of or all of the operations of the accelerator, the brakes, the turn signals, the steering, and the like are carried out automatically. Manual driving is a traveling mode of the vehicle in which the driver carries out all of the driving operations (the operations of the accelerator, the brakes, the turn signals, the steering, and the like). As illustrated in FIG. 1, an instrument panel 14 is provided at a front portion of the vehicle 12 inside the vehicle cabin.

The instrument panel 14 extends in the vehicle transverse direction, and a steering wheel 16 is provided at the vehicle right side of the instrument panel 14. Namely, in the present exemplary embodiment, as an example, the vehicle 12 is a right-hand drive vehicle in which the steering wheel 16 is provided at the right side, and the driver's seat is set at the vehicle right side.

A windshield glass 18 is provided at a front end portion of the instrument panel 14. The windshield glass 18 is disposed at the vehicle front side of the driver's seat, and extends in the vehicle vertical direction and the vehicle transverse direction, and partitions the vehicle cabin interior and the vehicle cabin exterior.

The vehicle right side end portion of the windshield glass 18 is fixed to a front pillar 20 that is at the vehicle right side. The front pillar 20 extends in the vehicle vertical direction, and the windshield glass 18 is fixed to the vehicle transverse direction inner side end portion of the front pillar 20. The front end portion of a front side glass 22 is fixed to the vehicle transverse direction outer side end portion of the front pillar 20. Note that the vehicle left side end portion of the windshield glass 18 is fixed to the unillustrated front pillar that is at the vehicle left side.

Here, the instrument panel 14 is provided with a first display portion 24 having a display region for predetermined images. The first display portion 24 is configured by a meter display that is provided at the vehicle front side of the driver's seat, at the vehicle transverse direction right side portion of the instrument panel 14. The meter display configures a portion of an unillustrated meter display device that is connected to various meter devices installed in the vehicle 12. The first display portion 24 is provided at a position that is within the field of view in a state in which the sightline of the driver is directed in the forward direction of the vehicle.

A second display portion 25 having a display region for predetermined images is provided at the instrument panel 14. The second display portion 25 is configured by a display that is provided at the vehicle front side of the driver's seat, at the vehicle transverse direction central portion of the instrument panel 14.

A third display portion 26 having a display region for predetermined images is provided at the windshield glass 18. The third display portion 26 is set at the vehicle upper side of the first display portion 24, and is configured by a projected plane that is projected by a head-up display device 44 (see FIG. 2). More specifically, the head-up display device 44 is provided further toward the vehicle front side than the instrument panel 14, and images are projected onto the third display portion 26 of the windshield glass 18 from this head-up display device 44. Namely, the third display portion 26 is configured by the windshield glass 18 that serves as the projected plane of the head-up display device 44.

(Hardware Configuration of Vehicle Display Control Device 10)

Figure 2:
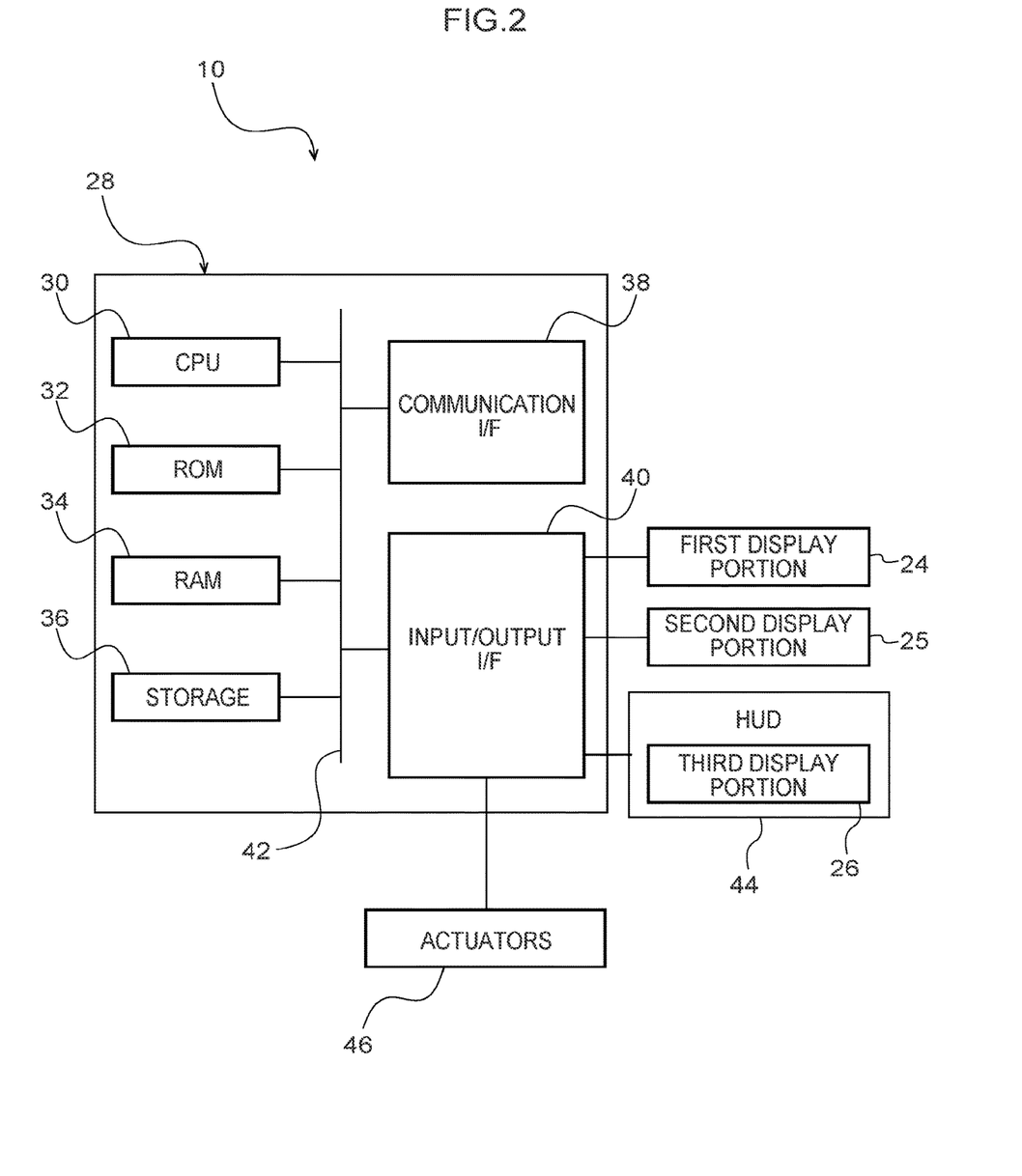
FIG. 2 is a block drawing illustrating a hardware configuration of the vehicle display control device relating to the present exemplary embodiment.

The vehicle 12 is provided with an ECU (Electronic Control Unit) 28 serving as a control section. FIG. 2 is a block drawing illustrating a hardware configuration of the vehicle display control device 10. As illustrated in FIG. 2, the ECU 28 of the vehicle display control device 10 is configured to include a CPU (Central Processing Unit: processor) 30, a ROM (Read Only Memory) 32, a RAM (Random Access Memory) 34, a storage 36, a communication interface 38 and an input/output interface 40. These respective configurations are connected through a bus 42 so as to be able to communicate with one another. The CPU 30 is an example of the processor, and the RAM 34 is an example of the memory.

The CPU 30 is a central computing processing unit, and executes various programs and controls various sections. Namely, the CPU 30 reads-out a program from the ROM 32 or the storage 36, and executes the program by using the RAM 34 as a workspace. The CPU 30 controls the above-described respective configurations and carries out various computing processings in accordance with programs recorded in the ROM 32 or the storage 36.

The ROM 32 stores various programs and various data. The RAM 34 temporarily stores programs and data as a workspace. The storage 36 is configured by an HDD (Hard Disk Device) or an SSD (Solid State Drive), and stores various programs, including the operating system, and various data. In the present exemplary embodiment, a program for carrying out display processing, and various data, and the like are stored in the ROM 32 or the storage 36.

The communication interface 38 is an interface used by the vehicle display control device 10 to communicate with unillustrated servers and other equipment, and, for example, employs standards such as Ethernet™, LTE, FDDI, Wi-Fi™ or the like.

The first display portion 24, the second display portion 25, the head-up display device 44 that causes predetermined images to be projected onto the third display portion 26, and actuators 46 are connected to the input/output interface 40. The actuators 46 are configured to include a steering actuator, an accelerator actuator, and a brake actuator. The steering actuator carries out steering of the vehicle 12. The accelerator actuator accelerates the vehicle 12. The brake actuator controls the brakes, and thereby decelerates the vehicle 12. Note that unillustrated cameras that capture images of the periphery of the vehicle 12 and the interior of the vehicle 12, and sensors and a GPS device and the like for automatically driving the vehicle 12, are connected to the input/output interface 40.

(Functional Configuration of the Vehicle Display Control Device 10)

The vehicle display control device 10 realizes various functions by using the above-described hardware resources. Explanation follows regarding the functional configurations that are realized by the vehicle display control device 10, with reference to FIG. 3.

Figure 3:
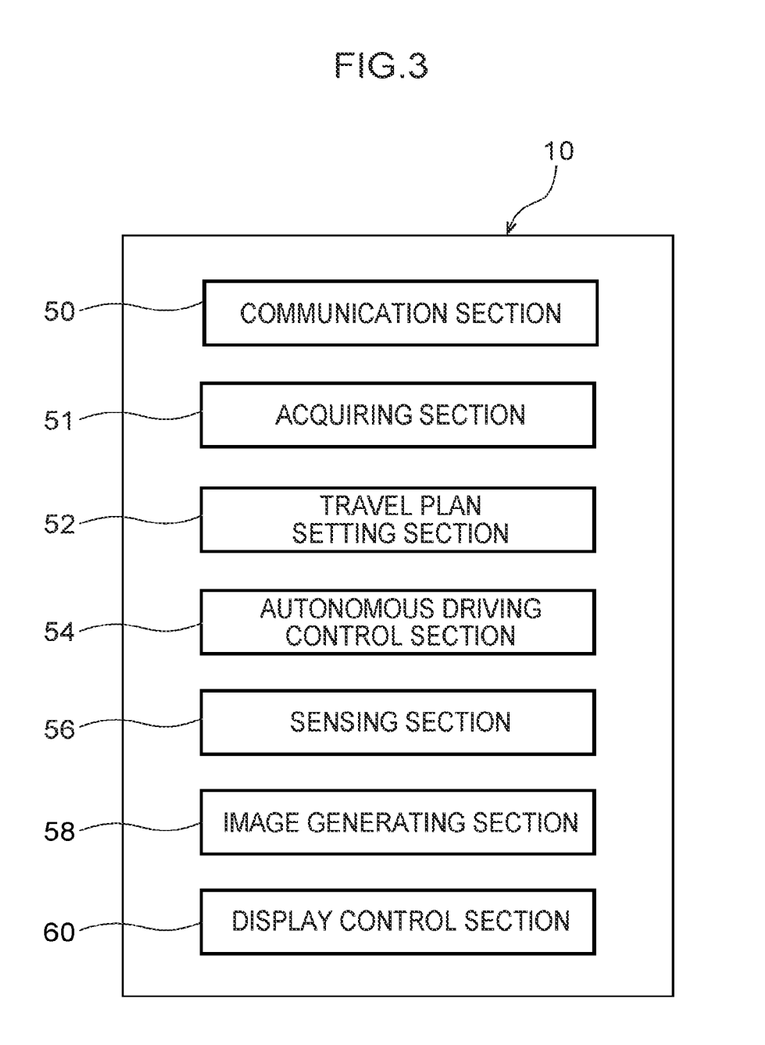
FIG. 3 is a block drawing illustrating a functional configuration of the vehicle display control device relating to the present exemplary embodiment.

As illustrated in FIG. 3, the vehicle display control device 10 is configured to include, as the functional configurations thereof, a communication section 50, an acquiring section 51, a travel plan setting section 52, an autonomous driving control section 54, a sensing section 56, an image generating section 58, and a display control section 60. Note that these respective functional configurations are realized by the CPU 30 reading-out and executing a program stored in the ROM 32 or the storage 36.

The communication section 50 transmits and receives data to and from external servers and other equipment through the communication interface 38. For example, the communication section 50 transmits and receives data such as map data and traffic situation data that are stored in servers. Further, the communication section 50 may be configured to carry out inter-vehicle communication with vehicles at the periphery.

The acquiring section 51 acquires the traveling environment of the vehicle 12 as periphery information from unillustrated external sensors, through the input/output interface 40. The external sensors are configured to include at least one of cameras that image predetermined ranges of the periphery of the vehicle 12, a millimeter-wave radar that transmits scanning waves over a predetermined range, or a LIDAR (Light Detection and Ranging/Laser Imaging Detection and Ranging) that scans a predetermined range. Moreover, "periphery information" includes, for example, information relating to the shape of the lane traveled by the vehicle 12, the road width, other vehicles traveling in the vicinity of the vehicle 12, obstacles and the like, as well as environment information such as the weather and darkness and the like of the vehicle surroundings.

Moreover, the acquiring section 51 acquires vehicle occupant information relating to vehicle occupants inside the vehicle cabin from unillustrated internal sensors. The internal sensors are configured to include at least one of cameras that capture images of predetermined ranges inside the vehicle cabin, and various biometric sensors that acquire biological responses of the vehicle occupants.

The travel plan setting section 52 sets a travel plan for the vehicle 12. More specifically, the travel plan from the current position to the destination point is set by a vehicle occupant inputting the destination point.

The autonomous driving control section 54 controls switching between manual driving and autonomous driving of the vehicle 12. Moreover, in a case in which the driving mode of the vehicle 12 is switched to autonomous driving, the autonomous driving control section 54 automatically drives the vehicle 12 along the set travel plan, while taking into consideration the position information and environment information of the periphery of the vehicle 12. More specifically, by controlling the actuators 46, the vehicle 12 is made to travel automatically.

The sensing section 56 senses that a change operation that changes the advancing direction of the vehicle 12 is planned during travelling of the vehicle 12. The change operation includes at least one of a right turn, a left turn, a U-turn, or the like of the vehicle. The sensing section 56 senses that a change operation is planned on the planned traveling route of the vehicle 12 on the basis of, for example, the travel plan set by the travel plan setting section 52. Moreover, the sensing section 56 senses that a change operation is planned in a case in which a turn signal for changing the advancing direction of the vehicle 12 is turned on by operation of a vehicle occupant.

The image generating section 58 generates images for display on the third display portion 26 that is the projected plane of the head-up display device 44. The images generated by the image generating section 58 include, for example, unillustrated meter displays indicating the traveling speed of the vehicle 12, and various images intended to assist manual driving and autonomous driving.

In the present exemplary embodiment, in particular, in a case in which it is sensed, on the basis of the function of the sensing section 56, that a change operation is planned for the vehicle 12, the image generating section 58 generates at least one directional image 70 that expresses the advancing direction of the vehicle 12 after the change. As an example, the directional image 70 of the present exemplary embodiment is an arrow-shaped image (see FIG. 6) expressing the advancing direction of the vehicle 12 after the change operation. Further, for example, the image generating section 58 generates the directional image 70 whose focal length is approximately the same distance as the focal length of the driver during driving, on the basis of the viewpoint of the driver in the driver's seat.

The display control section 60 causes the images generated by the image generating section 58 to be displayed in the display region of the third display portion 26. Here, the display control section 60 displays the directional image 70 in the display region of the third display portion 26 so as to be integrated into the foreground of the vehicle 12 viewed through the third display portion 26 (the windshield glass 18).

As an example, the display control section 60 refers to the map data and to the images of the camera that captures the foreground of the vehicle 12, and, from the foreground of the vehicle 12, specifies a change operation point at which a change operation is to be carried out, and causes the directional image 70 to be displayed at a position corresponding to the change operation point that the driver in the driver's seat views through the third display portion 26. Accordingly, when viewed from the driver in the driver's seat, the directional image 70 is displayed at a position corresponding to the actual image of the change operation point that is viewed through the windshield glass 18. Moreover, the display control section 60 changes the number of directional images 70 and the display mode thereof in accordance with the distance from the vehicle 12 to the change operation point. A detailed method of displaying the directional image 70 will be described later.

(Operation)

Operation of the present exemplary embodiment is described next.

(Display Processing)

An example of the display processing that displays the directional image 70 in the display region on the basis of the travel plan of the vehicle 12, is described with reference to FIG. 4. This display processing is executed by the CPU 30 reading-out a display program from the ROM 32 or the storage 36, and expanding the display program in the RAM 34.

Figure 4:
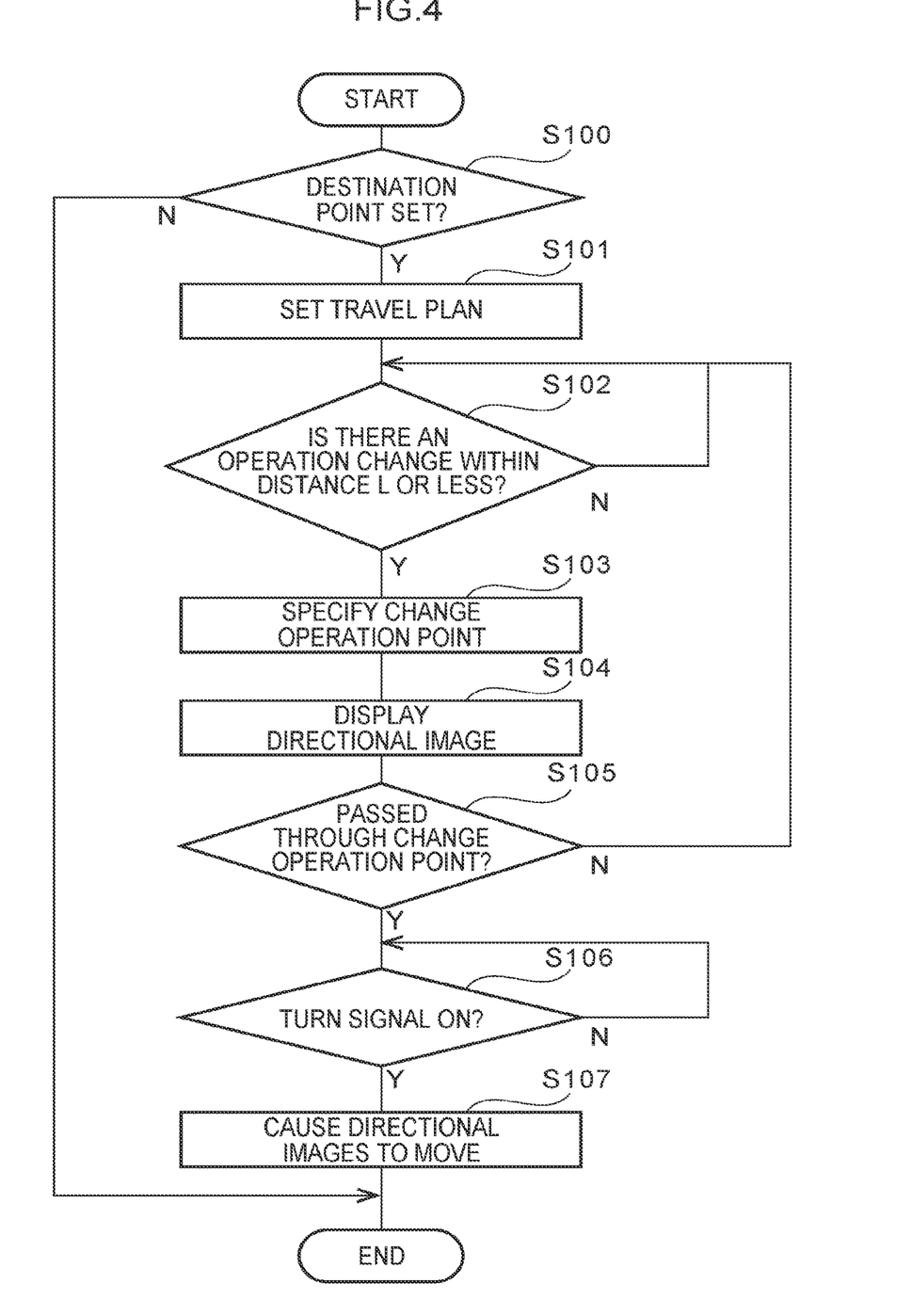
FIG. 4 is a flowchart illustrating an example of the flow of display processing in the present exemplary embodiment.

As illustrated in FIG. 4, in step S100, the CPU 30 judges whether or not a destination has been set. The destination may be directly inputted to the vehicle 12 by a vehicle occupant or indirectly inputted via a portable terminal or the like.

In step S100, in a case in which the CPU 30 judges that a destination has been set, the routine moves on to step S101. In a case in which the CPU 30 judges in step S100 that a destination has not been set, the display processing is ended.

In step S101, the CPU 30 sets a travel plan for the vehicle 12. More specifically, the CPU 30 sets a travel plan from the current location to the destination by the function of the travel plan setting section 52. Information relating to traffic situations and accidents and the like may be acquired and reflected at the time of setting the travel plan. Further, the travel plan may be set so as to increase the number of instances of autonomous driving in accordance with a request from a vehicle occupant that is inputted in advance.

In step S102, on the basis of the travel plan, the CPU 30 judges whether or not there is a plan to carry out a change operation within a predetermined distance L from the position of the vehicle 12. Here, because the distance L is set to 100 m as an example, in step S102, the CPU 30 judges whether or not a change operation is not planned at a point whose distance from the vehicle 12 is 100 m or less. In a case in which there is no change operation, the CPU 30 repeats the processing of step S102, and, in a case in which there is a change operation, the routine moves on to the processing of step S103.

In step S103, the CPU 30 specifies the change operation point at which the change operation is to be carried out. In the present exemplary embodiment, the change operation point is the point at which the turn signal is to be turned on in order for the vehicle 12 to carry out the change operation. For example, on the basis of the travel plan of the vehicle 12, the CPU 30 sets, as the change operation point, a point that is a predetermined distance (e.g., 30 m) toward the near side from the point at which the advancing direction will changed. The CPU 30 then specifies the position that corresponds to the set change operation point, from the image of the camera that captures the foreground of the vehicle 12.

In step S104, on the basis of the function of the display control section 60, the CPU 30 displays the directional image 70 in front of the position corresponding to the change operation point, in the foreground that is illustrated in the third display portion 26. At this time, the CPU 30 causes the display to be carried out such that the number of directional images 70 displayed on the third display portion 26 gradually increases during the time period until the vehicle 12 reaches the change operation point.

Figure 5:
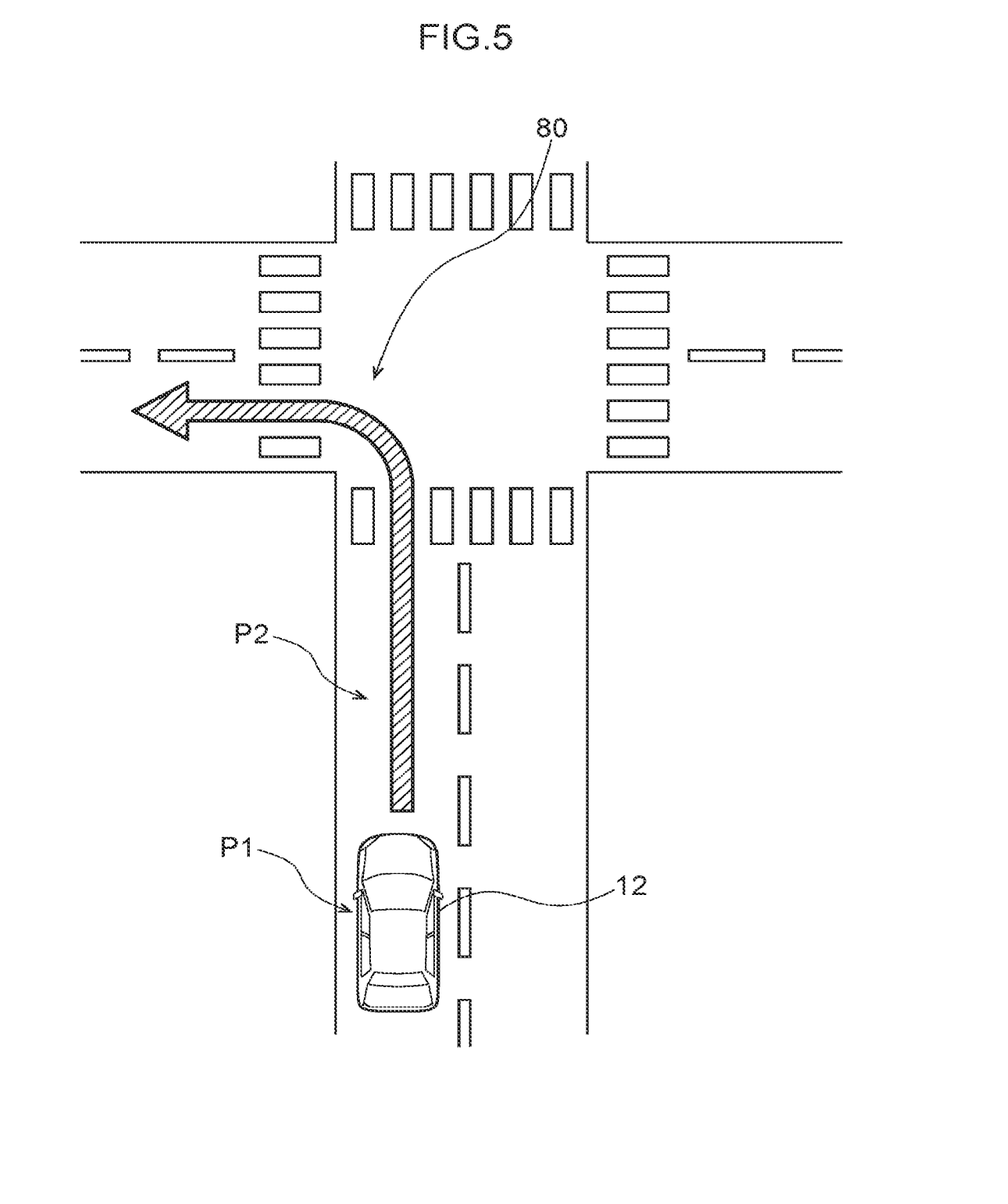
FIG. 5 is a drawing illustrating an example of a planned travelling route of the vehicle.

For example, as illustrated in FIG. 5, in a case in which a change operation in which the vehicle 12 turns left at intersection 80 is planned, the CPU 30 sets point P2, which is 30 m toward the near side from the intersection 80, as the change operation point. FIG. 6A through FIG. 6D illustrate, over time, a situation in which the display mode of the third display portion 26 changes as the distance from the vehicle 12 to the intersection 80 becomes shorter.

Figure 6A:
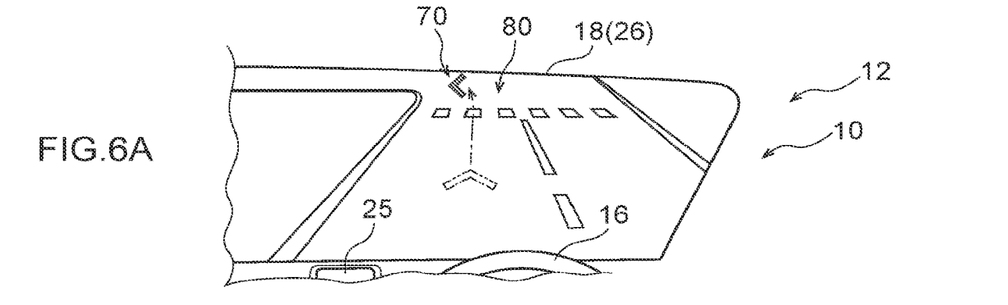
FIG. 6A is an example illustrating a method of displaying a directional image over time during a time period until the vehicle reaches a change operation point.

When the vehicle 12 passes through point P1 that is 100 m toward the near side from the intersection 80, the CPU 30 displays the single directional image 70 on the third display portion 26. At this time, as illustrated in FIG. 6A, the directional image 70 is displayed as an animation image that moves along the route from the vehicle 12 to the change operation point P2. More specifically, first, the directional image 70 is shown as an arrow-shaped image indicating the forward direction that is the advancing direction of the vehicle 12, and moves along the route from the vehicle 12 to the change operation point P2 from the near side to the far side in the display region of the third display portion 26. When the directional image 70 moves to the position corresponding to the intersection 80, the directional image 70 changes to an arrow-shaped image indicating the leftward direction, and stops. This enables the vehicle occupant to, by looking at the directional image 70, intuitively understand that a left turn of the vehicle 12 is planned.

Figure 6B:
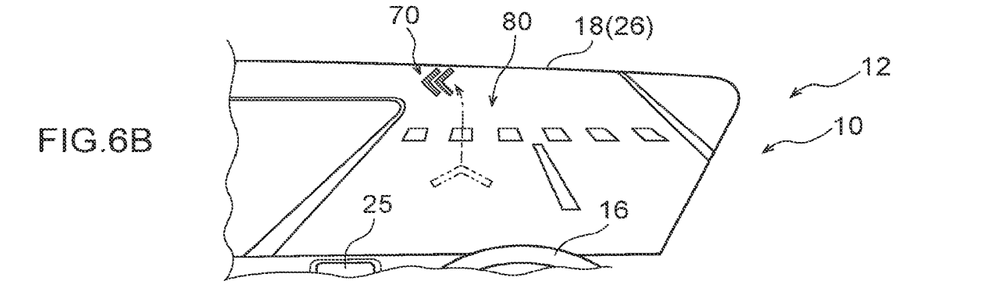
FIG. 6B is an example illustrating the method of displaying the directional images over time during the time period until the vehicle reaches the change operation point.
Figure 6C:
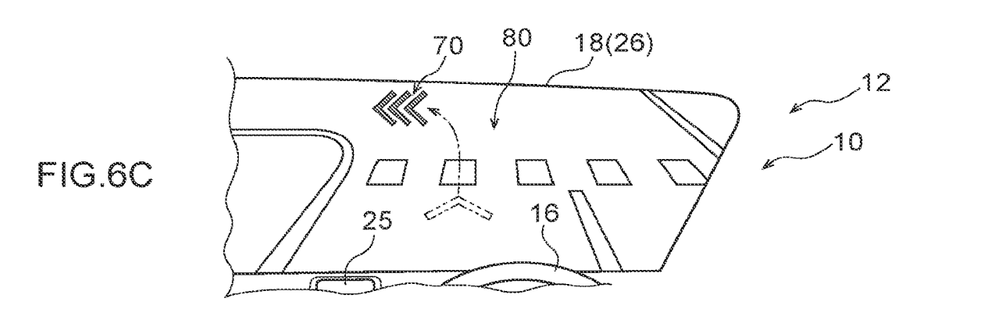
FIG. 6C is an example illustrating the method of displaying the directional images over time during the time period until the vehicle reaches the change operation point.

As the vehicle 12 approaches the intersection 80 even more, as illustrated in FIG. 6B, the CPU 30 causes the second directional image 70 to be displayed on the third display portion 26. Similarly to the first directional image 70, the second directional image 70 is displayed as an animation image that moves along the route from the vehicle 12 to the change operation point P2. The second directional image 70 stops at the position corresponding to the intersection 80 of the third display portion 26, and is displayed so as to be lined-up with the first directional image 70. After the second directional image 70 is displayed, the CPU 30 similarly displays the third directional image 70 as illustrated in FIG. 6C.

In this way, the CPU 30 displays the three directional images 70 so as to be lined-up on the third display portion 26 during the time period until the vehicle 12 reaches the change operation point P2. By recognizing that the three directional images 70 are displayed on the third display portion 26, the vehicle occupant can grasp the timing at which he/she should turn the turn signal on.

In step S105, the CPU 30 judges whether or not the vehicle 12 has passed through the change operation point. In a case in which the CPU 30 judges that the vehicle 12 has passed through the change operation point, the routine moves on to the processing of step S106, and, in a case in which the CPU 30 judges that the vehicle 12 has not passed through the change operation point, the routine returns to step S102, and the processings are repeated.

In step S106, the CPU 30 judges whether or not the turn signal is on in order to carry out the change operation. In a case in which it is judged that the turn signal is on, the routine moves on to step S107. In a case in which it is judged that the turn signal is not on, the processing of step S106 is repeated.

Figure 6D:
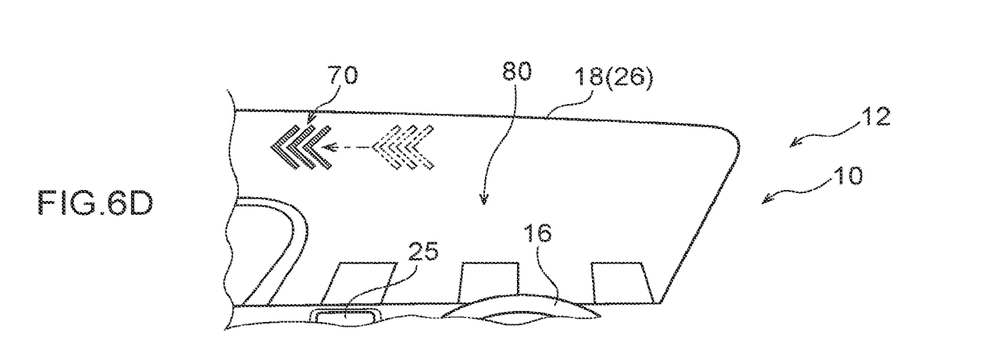
FIG. 6D is an example of the method of displaying the directional images after the vehicle has passed through the change operation point.

When the CPU 30 judges that the turn signal is on and moves on to the processing of step S107, in step S107, the CPU 30 displays the three directional images 70, which are displayed on the third display portion 26, as animation images and such that the directional images 70 move in the direction of advancing after the change operation (move leftward in FIG. 6D). This enables the occupant to intuitively understand the timing at which the advancing direction of the vehicle 12 is to be changed by looking at the directional images 70 that move in the advancing direction. When the processing of step S107 ends, the CPU 30 ends the display processing.

As described above, the vehicle display control device 10 of the present exemplary embodiment displays a predetermined image in the display region of the third display portion 26 that shows the foreground of the vehicle 12. Further, in a case in which a change operation that changes the advancing direction of the vehicle 12 is planned, the vehicle display control device 10 displays at least one directional image 70, which shows the advancing direction after the change, in the display region. Due thereto, by looking at the third display portion 26, the vehicle occupant can understand in advance that the advancing direction of the vehicle 12 is to be changed to the direction indicated by the directional image(s) 70.

Note that, in the present exemplary embodiment, during the time period until the vehicle 12 reaches the change operation point at which the change operation is to be carried out, the directional images 70 are displayed while the number thereof is changed. By changing the number of directional images, the extent of reaching the change operation point can be expressed, and therefore, the vehicle occupant can intuitively understand the timing at which the advancing direction of the vehicle 12 is to be changed.

More specifically, in the present exemplary embodiment, in a case in which the distance from the vehicle 12 to the change operation point is less than or equal to the predetermined distance L (a predetermined threshold value), the directional images 70 are displayed while gradually increasing the number thereof. Due thereto, the directional image(s) 70 can be displayed while being adjusted gradually in accordance with the actual extent to which the vehicle 12 has reached the change operation point. Therefore, the vehicle occupant can intuitively and accurately grasp the timing at which the advancing direction of the vehicle 12 is to be changed.

Further, as illustrated in FIG. 6A through FIG. 6C, in the present exemplary embodiment, the directional image 70 is displayed so as to move from the near side to the far side of the display region of the third display portion 26 along the route from the vehicle 12 to the change operation point. Due thereto, the vehicle occupant can intuitively grasp that the change operation point exists ahead of the current travelling point of the vehicle 12, and can feel secure that he/she has not missed the change operation point.

Further, the change operation point is the operation point at which the turn signal is to be turned on in order to change the advancing direction of the vehicle. Therefore, by recognizing that the number of directional images 70 displayed on the third display portion 26 has reached a maximum number, the vehicle occupant can intuitively grasp the timing at which the turn signal is to be turned on.

Moreover, as illustrated in FIG. 6D, after the vehicle 12 has passed through the change operation point, the directional image 70 is displayed so as to move in the direction of advancing after this change. Due thereto, at the time when the advancing direction of the vehicle 12 is to be changed, it is easy for the vehicle occupant to visually comprehend the post-change advancing direction.

Further, in the present exemplary embodiment, the third display portion 26 is a projected plane that is projected by the head-up display device 44 at the vehicle front side of the driver's seat. Further, the change operation point in the actual image that is viewed through the display region of the third display portion 26 is specified, and the directional image 70 is displayed at a position, which corresponds to the specified change operation point, in the display region. In this way, the vehicle display control device 10 displays the directional image 70 so as to be superimposed on the foreground that can be seen from the driver's seat. Therefore, the vehicle occupant in the driver's seat can intuitively recognize the timing at which the advancing direction is to be changed, without significantly moving his/her sightline.

[Supplementary Explanation]

Although the above exemplary embodiment describes a case in which the display region that illustrates the foreground of the vehicle is configured by the projected plane of the head-up display device 44, the present invention is not limited to this. As in vehicle display control device 100 relating to the modified example illustrated in FIG. 7, the directional image 70 may be displayed in the display region of the second display portion 25 that is a display provided at the instrument panel 14. At the second display portion 25 illustrated in FIG. 7, a map image N showing the current position of the vehicle 12 is displayed at the lower portion of the display region, and a foreground image F showing the foreground of the vehicle is displayed at the upper portion of the display region. The foreground image F is configured by, for example, an image acquired from an unillustrated camera that captures images of the region ahead of the vehicle 12, or a foreground image that is formed by animation.

Figure 7:
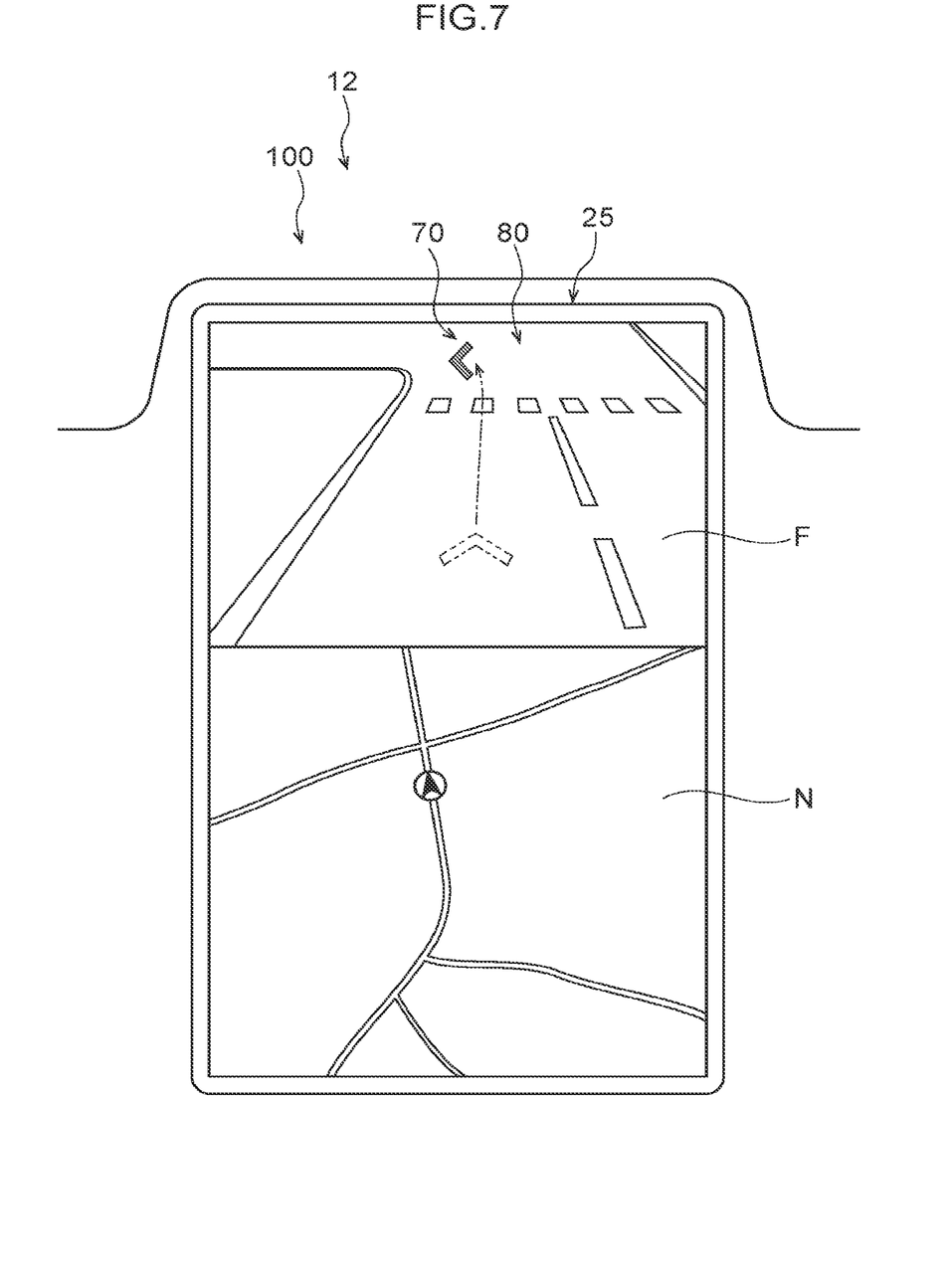
FIG. 7 is a schematic drawing illustrating a vehicle display device relating to a modified example of the present exemplary embodiment.

Similarly, the directional image 70 may be displayed in the display region of the first display portion 24 that is the meter display provided at the instrument panel 14 at the vehicle front side of the driver's seat. Because the first display portion 24 is provided at the vehicle front side of the driver's seat, the vehicle occupant in the driver's seat can view the first display portion 24 while hardly shifting his/her sightline at all from the foreground of the vehicle, and can recognize information relating to the destination point of the vehicle 12.

Note that the display mode of the directional image 70 described in the above exemplary embodiment is an example, and can be modified appropriately within a scope that does not depart from the gist of the present invention.

Further, in the display processing of the above exemplary embodiment, the directional image 70 is displayed in a case in which a change operation of the vehicle 12 is planned in the travel plan from the current position to the destination. However, the present invention is not limited to this. For example, in a case in which a turn signal for changing the advancing direction is turned on by operation of a vehicle occupant, it may be judged that a change operation is planned, and the directional image 70 may be displayed.

Further, in the above display processing, the directional image 70 is displayed in a case in which the distance to the change operation is less than or equal to the distance L, but the present invention is not limited to this, and the directional image may be displayed in a case in which the time until the change operation is shorter than a predetermined time. In this case, the time until the change operation may be calculated on the basis of the speed of the vehicle 12 and the distance to the change operation.

Further, in the above display processing, the number of directional images 70 is increased during the time period until the vehicle 12 reaches the change operation point. However, the present invention is not limited thereto. For example, directional images may be displayed such that the number thereof is reduced during the time period until the vehicle 12 reaches the change operation point. In this case, the directional images can be adjusted and displayed by changing them from plural directional images into a single, large directional image as the number of directional images decreases. Or, the directional images may be changed so as to weaken the sense of the presence thereof by reducing the number thereof, and the directional images may be displayed such that the timing of the change operation is counted.

In the above display processing, the change operation point is set as the point at which the turn signal is to be turned on, but the present invention is not limited to this. For example, the operation point at which a steering operation is to be carried out in order to change the advancing direction of the vehicle 12 may be set as the change operation point.

Although the directional image is displayed in the display region provided inside the vehicle cabin in the above exemplary embodiment, the present invention is not limited to this. For example, in a case in which an operation signal is received from a remote control device provided at the exterior of the vehicle 12, and the vehicle 12 is remotely controlled, if the operator of the remote control device is interpreted as a vehicle occupant of the vehicle 12, the display region is not limited to a case of being provided inside the vehicle cabin, and may be provided at the exterior of the vehicle 12. Further, the directional image may be displayed at a display region provided at the exterior of the vehicle 12.

Note that any of various types of processors other than a CPU may execute the display processing that is executed due to the CPU reading-out software (a program) in the above-described exemplary embodiment. Examples of processors in this case include PLDs (Programmable Logic Devices) whose circuit configuration can be changed after production such as FPGAs (Field-Programmable Gate Arrays) and the like, and dedicated electrical circuits that are processors having a circuit configuration that are designed for the sole purpose of executing specific processings such as ASICs (Application Specific Integrated Circuits) and the like, and the like. Further, the display processing may be executed by one of these various types of processors, or may be executed by a combination of two or more of the same type or different types of processors (e.g., plural FPGAs, or a combination of a CPU and an FPGA, or the like). Further, the hardware configurations of these various types of processors are, more specifically, electrical circuits that combine circuit elements such as semiconductor elements and the like.

Further, the above exemplary embodiment describes a form in which the programs for the display processing and the lane change display processing are stored in advance (installed) in the ROM or the storage, but the present invention is not limited to this. The programs may be provided in forms of being recorded on a recording medium such as a CD-ROM (Compact Disc Read Only Memory), a DVD-ROM (Digital Versatile Disc Read Only Memory), a USB (Universal Serial Bus) memory, or the like. Further, the programs may be in a form that is downloaded from an external device over a network.

What is claimed is:

1. A vehicle display control device that displays a predetermined image at a display region showing a foreground of a vehicle, the vehicle display control device comprising:
   a memory; and
   a processor coupled to the memory,
   wherein the processor is configured to:
      display, on the display region, a directional image that indicates an advancing direction being planned in a case in which at least one of a distance or a time from the vehicle to a change operation point is less than or equal to a predetermined threshold value; and
      gradually increase a number of directional images displayed as the vehicle approaches the change operation point at which a change operation is to be carried out such that each subsequent directional image moves continually over time along a future path of the vehicle toward the change operation point and stops at a point along the future path that is ahead of the change operation point and behind the directional image that is displayed just before.

2. The vehicle display control device of claim 1, wherein the processor is further configured to increase the number of directional images during the time period until the vehicle reaches the change operation point.

3. The vehicle display control device of claim 1, wherein the processor is further configured to display a first directional image such that the first directional image moves from a near side toward a far side of the display region, along a path from the vehicle to the change operation point.

4. The vehicle display control device of claim 1, wherein, after the vehicle has passed the change operation point, the processor is further configured to display a first directional image such that the directional image moves in the advancing direction after the change operation.

5. The vehicle display control device of claim 1, wherein the change operation point is an operation point at which a turn signal is to be turned on in order to change the advancing direction of the vehicle.

6. The vehicle display control device of claim 1, wherein the change operation point is an operation point at which a steering operation is to be carried out in order to change the advancing direction of the vehicle.

7. The vehicle display control device of claim 1, wherein
   the display region is a projected plane that is projected at a vehicle front side of a driver's seat by a head-up display device, and
   the processor is further configured to specify the change operation point from the foreground of the vehicle viewed through the display region, and display a first directional image at a position corresponding to the change operation point in the display region.

8. A display method that displays a predetermined image at a display region showing a foreground of a vehicle, the display method comprising:
   displaying, on the display region, a first directional image that indicates an advancing direction being planned in a case in which at least one of a distance or a time from the vehicle to a change operation point is less than or equal to a predetermined threshold value; and
   gradually increasing a number of directional images displayed as the vehicle approaches the change operation point at which a change operation is to be carried out such that each subsequent directional image moves continually over time along a future path of the vehicle toward the change operation point and stops at a point along the future path that is ahead of the change operation point and behind the directional image that is displayed just before.

* * * * *